United States Patent [19]
Lenssen et al.

[11] Patent Number: 5,831,553
[45] Date of Patent: Nov. 3, 1998

[54] INPUT APPARATUS FOR A DATA PROCESSING SYSTEM

[75] Inventors: Kars-Michiel H. Lenssen; Peter Martens, both of Eindhoven, Netherlands

[73] Assignee: U.S. Philips Corporation, New York, N.Y.

[21] Appl. No.: 756,964

[22] Filed: Oct. 23, 1996

[30] Foreign Application Priority Data

Oct. 23, 1995 [EP] European Pat. Off. ............... 95202862

[51] Int. Cl.⁶ ........................................ G09G 5/08
[52] U.S. Cl. ............... 341/20; 341/32; 345/163; 345/164; 345/167
[58] Field of Search ................. 341/20, 32, 35; 345/163, 164, 167; 324/207.11, 207.13, 207.25, 174

[56] References Cited

U.S. PATENT DOCUMENTS

| | | | |
|---|---|---|---|
| 5,055,781 | 10/1991 | Sakakibara | 324/207.25 |
| 5,130,650 | 7/1992 | Lemarquand | 324/207.25 |
| 5,157,329 | 10/1992 | Brauer | 324/207.25 |
| 5,302,893 | 4/1994 | Yoshimura | 324/207.25 |
| 5,600,238 | 2/1997 | Holloway | 324/207.25 |
| 5,637,995 | 6/1997 | Izawa | 324/174 |

FOREIGN PATENT DOCUMENTS 5265642  10/1993  Japan .

*Primary Examiner*—Michael Horabik
*Assistant Examiner*—Albert K. Wong
*Attorney, Agent, or Firm*—Brian J. Wieghaus

[57] ABSTRACT

Input apparatus for a data processing system. An input apparatus, for example a mouse or a track ball, comprises a member which is rotatable by manipulation by a user. The rotation causes a change of a magnetic field, which change is detected by a detector. The member in the apparatus in accordance with the invention comprises a non-homogeneous distribution of a soft-magnetic material which, upon rotation, changes a magnetic field externally applied to the member by a magnet.

15 Claims, 5 Drawing Sheets

INPUT APPARATUS FOR A DATA PROCESSING SYSTEM

BACKGROUND OF THE INVENTION

The invention relates to an input apparatus for presenting data elements to a data processing system by physical manipulation by a user, the apparatus comprising:
- a housing and a member which can be rotated relative to the housing by said manipulation,
- magnetic means for generating a magnetic field, and
- a detector for detecting the rotation on the basis of changes in the magnetic field which are caused by the rotation.

The invention also relates to a data processing system comprising an input apparatus.

The invention also relates to a member for use in an input apparatus.

An input apparatus of the kind set forth is known from Japanese Patent Application JP 5-265642. The known apparatus comprises a ball with a large number of magnetic poles provided on the surface. Outside the ball there is arranged a detector for detecting non-magnetic lines between the poles. Upon rotation of the ball the number of lines passing the detector is counted and the rotation of the ball is determined on the basis thereof. The formation of the large number of magnetic patterns on the ball constitutes a drawback of the known apparatus.

SUMMARY OF THE INVENTION

It is an object of the invention to provide an apparatus of the kind set forth whose manufacture is simpler than that of the known apparatus. To achieve this, the apparatus in accordance with the invention is characterized in that the magnetic means comprise a magnet which is arranged externally of the member, and that the member contains a soft-magnetic material in a non-homogeneous distribution in order to induce said changes. In the apparatus in accordance with the invention, the member containing the soft-magnetic material influences the magnetic field applied externally of the body. Because the distribution of the soft-magnetic material is not homogeneous, rotation of the member causes different influencing of the magnetic field, this change being detected by the detector. The member in accordance with the invention itself does not contain magnetic patterns so that its manufacture is simpler than that of the known member comprising the permanent magnetic patterns. The apparatus in accordance with the invention offers a further advantage in that it is comparatively insensitive to disturbances. The field applied externally of the member can be chosen so as to be stronger than in the known apparatus, so that a stronger signal which is less sensitive to disturbances from the environment, if any, is measured.

An embodiment of the apparatus in accordance with the invention is characterized in that the non-homogeneous distribution in the member is provided by discrete soft-magnetic elements arranged in a regular, spherical distribution. Rotation of the member with the spherical, regular distribution of soft-magnetic elements produces a series of pulse-shaped signals from the sensor. The number of pulses is then a measure of the degree of rotation, irrespective of the position of the body at the beginning of the rotation. Furthermore, the direction in which the soft-magnetic elements pass the detector can be established by analysis of the pulses. Thus, the direction of the rotation of the member can be determined without further aids being required. The pulse-shaped signals from the sensor are applied, possibly after intermediate processing, to the data processing system so as to initiate a given operation therein. The principle of a series of pulses as a measure of the rotation of the body is used in many input apparatus (be it that therein the detection of the rotation takes place in a completely different manner) so that it constitutes a standard in this field. Complying with such a standard offers the advantage that the apparatus in accordance with the invention can readily cooperate with existing systems.

An embodiment of the apparatus in accordance with the invention is characterized in that the soft-magnetic elements have a spherical shape and are packed in a dense spherical packing in a spherical shell of the member. The dense spherical packing of the soft-magnetic, spherical elements in a spherical shell of the member can be simply realized and produces a regular distribution of the elements throughout the spherical member.

An embodiment of the apparatus in accordance with the invention is characterized in that the detector comprises a magnetoresistive sensor for measuring a component of the magnetic field between the magnet and the member. The resistance of the magnetoresistive sensor is dependent on the magnitude of a given directional component of the magnetic field in which the sensor is situated. Changes in magnitude of said component cause changes in the resistance of the sensor which can be simply measured in an electronic circuit.

An embodiment of the apparatus in accordance with the invention is characterized in that the magnetoresistive sensor is asymmetrically arranged between the magnet and the member in order to obtain a stabilizing magnetic field in the sensor in the direction perpendicular to the component to be measured. By arranging the magnetoresistive sensor off-center with respect to the magnet, the stray field of the magnet induces in the sensor a second component of the magnetic field which extends perpendicularly to the original component measured by the sensor. The second component stabilizes the magnetization of the magnetoresistive sensor.

An embodiment of the apparatus in accordance with the invention is characterized in that the apparatus comprises an electromagnet for generating a further magnetic field at the area of the member in response to a signal from the data processing system. When a comparatively large further magnetic field is generated by means of the electromagnet, rotation of the member by the user is hampered. The further magnetic field exerts a comparatively strong force of attraction on the soft-magnetic material in the member, so that the member is to some extent fixed in a given position. Excitation of the electromagnet under the influence of the data processing system can assist the user in operating the apparatus. If the input apparatus is used, for example for controlling a cursor on a display screen of the data processing system, said principle of fixation can be used to make the system pull the cursor to given positions on the display screen and to retain the cursor therein with a given force.

An embodiment of the apparatus in accordance with the invention is characterized in that the member incorporates asymmetrically positioned with respect to its center a comparatively heavy body. The gravitational force on the heavy body will force the member in a position in which this body is in the lowest position with respect to the center of the member. A manipulation of the apparatus through which it is rotated with respect to its environment, causes a rotation of the member relative to the housing. So a user can operate the apparatus without touching the member itself.

Further attractive embodiments of the apparatus in accordance with the invention are disclosed in the dependent Claims.

BRIEF DESCRIPTION OF THE DRAWINGS

These and other aspects of the invention will be apparent from and elucidated with reference to the embodiments described hereinafter.

In the drawings.

Corresponding reference numerals in the Figures denote corresponding parts.

DETAILED DESCRIPTION OF THE PREFERRED EMBODIMENTS

Figure 1:
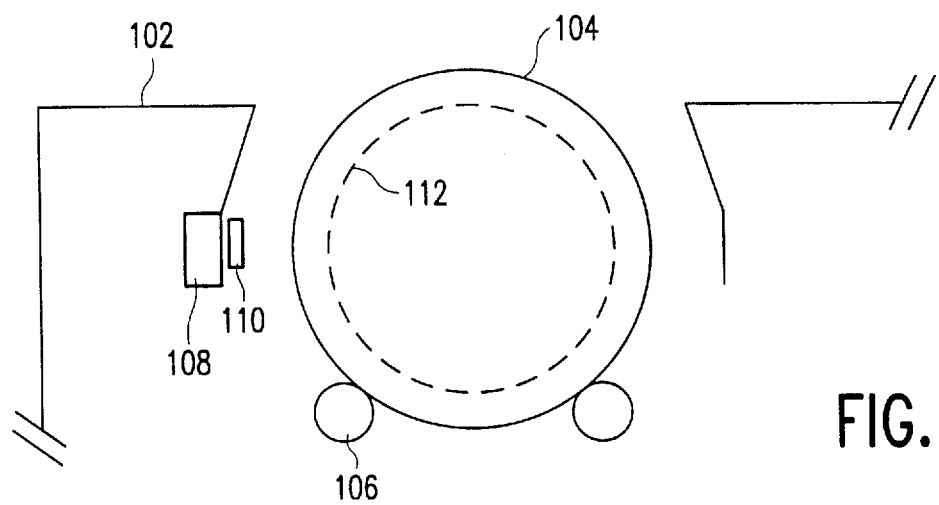
FIG. 1 is a sectional view of a part of the input apparatus in accordance with the invention in a side elevation.

FIG. 1 is a sectional view of a part of the input apparatus in accordance with the invention. The apparatus comprises a housing 102 and a member 104 which is rotatable with respect to the housing. Rotatability can be achieved, for example by means of supporting rollers 106 or by means of a shaft extending through the member if the latter is a cylinder. The apparatus comprises a magnet 108 for generating a magnetic field in the vicinity of the member 104. The apparatus also comprises a magnetic field detector 110 for measuring the magnitude of a component of the magnetic field near the member. The member contains a non-homogeneous distribution of a soft-magnetic material 112. The soft-magnetic material influences the magnetic field in a manner which is dependent on the position of the member relative to the housing. Rotation of the member changes the magnitude of the magnet field component at the area of the detector and this change is detected by the detector. The detector can be implemented in various ways. It can be provided with a so-called Hall sensor for measuring the field strength. It is alternatively possible, however, to use a magnetoresistive (MR) sensor for this purpose. Such an MR sensor has a resistance which is dependent on the magnitude of a magnetic field component passing through the sensor. Changes of said magnitude cause resistance variations which can be simply measured in a circuit. It is alternatively possible to use a magnetoresistive sensor based on the GMR (Giant Magneto Resistive) effect. In comparison with the conventional MR sensor, sometimes also referred to as an AMR (Anisotrope Magneto Resistive) sensor, a GMR sensor causes a larger variation of the resistance in response to the same change of the magnetic field.

Figure 2:
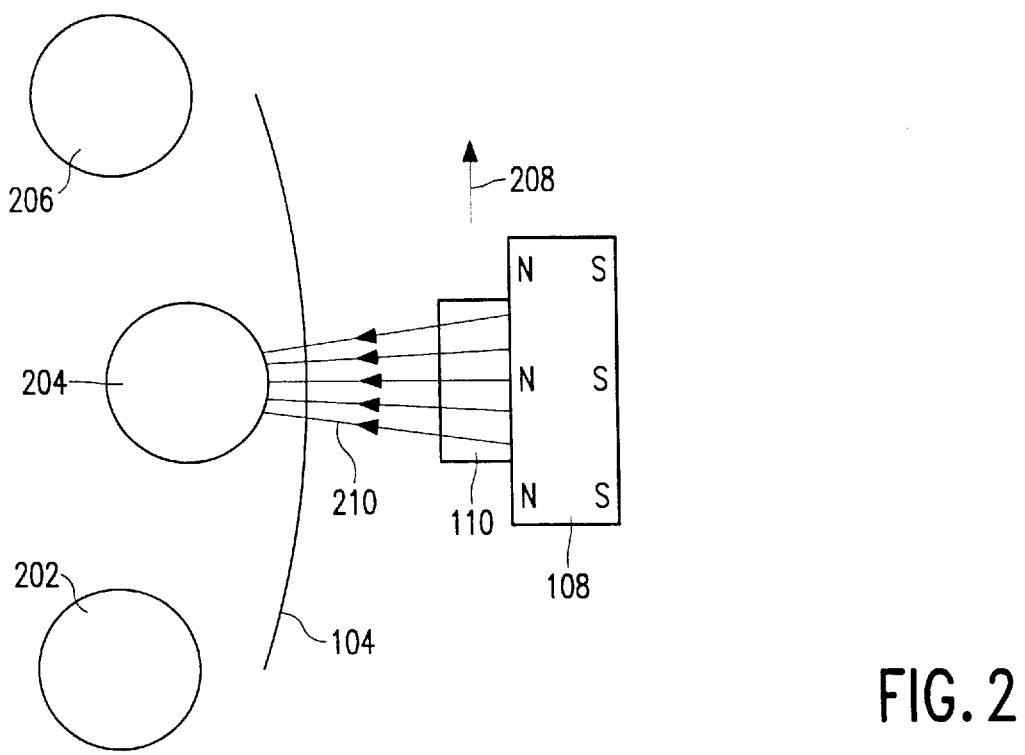
FIG. 2 illustrates the principle of the invention, the member comprising a regular distribution of soft-magnetic elements.

FIG. 2 illustrates the principle of the invention, the member 104 being provided with a regular distribution of soft-magnetic elements 202, 204 and 206 which move past the detector 110 during rotation of the member. In this arrangement, the detector 110 is sensitive to the magnetic field in the direction 208. Magnetic field lines 210 extend from the magnet 108 to the element 204 of the member. In the position of the member shown in FIG. 2, i.e. the position in which the elements 202, 204 and 206 are symmetrically situated with respect to the detector 110, no magnetic field component (on average) is present in the detector in the direction in which the latter is sensitive. The detector then supplies a signal which corresponds to the absence of a magnetic field. Such a signal is also referred to as a zero signal or reference signal.

Figure 3:
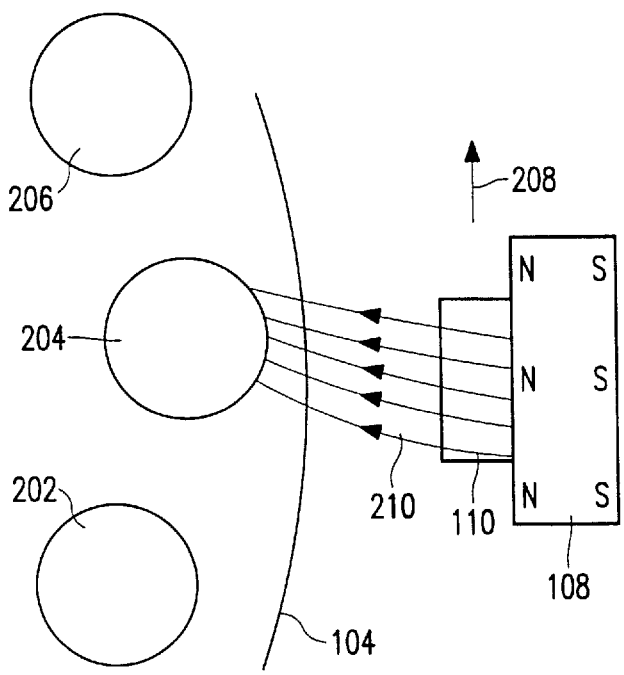
FIG. 3 shows the same arrangement as FIG. 2 after rotation of the member through a given angle.

FIG. 3 shows the same arrangement as FIG. 2 after the member has been rotated through a given angle. Because of this position of the element 204 with respect to the magnet 108, the field lines 210 now extend through the detector in such a manner that a magnetic field component arises in the direction in which the detector is sensitive. This results in an associated detector signal, wherefrom the rotation of the member with respect to FIG. 2 can be detected. Due to the regular distribution of the elements 202, 204 and 206 along the surface of the member, the detector outputs a pulsed signal upon rotation, the number of pulses being a measure of the magnitude of the rotation. If the member 104 is rotated further than shown in FIG. 3, a maximum will occur in the detector signal at a given instant, after which the signal starts to decrease. The signal returns to the zero signal of FIG. 2 when the elements 204 and 202 are symmetrically situated with the respect to the detector. In that case (on average) again no magnetic field component will be present in the direction 208 in which the detector is sensitive. If the member is then rotated further, the detector signal will become negative with respect to the zero signal as the element 202 is approached, because a magnetic field component then arises which is the reverse of the direction 208.

In the arrangement shown in the FIGS. 2 and 3 the passage of the soft-magnetic elements along the detector causes a series of pulses. The number of pulses indicates the number of elements which have passed and, given the distribution of the elements over the member, the rotation can be determined therefrom. The complete passage of an element produces a pulse containing a negative part and a positive part with respect to the zero value. If the member rotates counter clock-wise as shown in FIG. 3, the element 202 will start to influence the field through the detector at a given instant. Initially this will cause a negative detector signal, because the field is oriented in the opposite direction with respect to the sensitivity direction 208 of the detector. When the element is situated exactly opposite the detector, the detector will output a zero signal and when the member is rotated further, the detector will supply a positive signal as described with reference to FIG. 3. Counter-clockwise rotation of the member thus produces a pulse which first comprises a negative part and subsequently a positive part. Clockwise rotation produces a pulse which comprises first a positive part and then a negative part. The direction of rotation of the member with respect to the detector can thus be determined by analysis of the pulse. The apparatus in accordance with the invention thus enables simple determination of the magnitude as well as the direction of the rotation of the member with respect to the detector.

The detector 110 may be provided with an AMR (Anisotrope Magneto Resistive) sensor. In that case it is advantageous to arrange the sensor slightly off-center of the magnet in the direction 208 in which the sensor is sensitive. An arrangement of this kind produces a permanent magnetic field component in the sensor which is attractive with a view to stabilization of the sensor.

Figure 4:
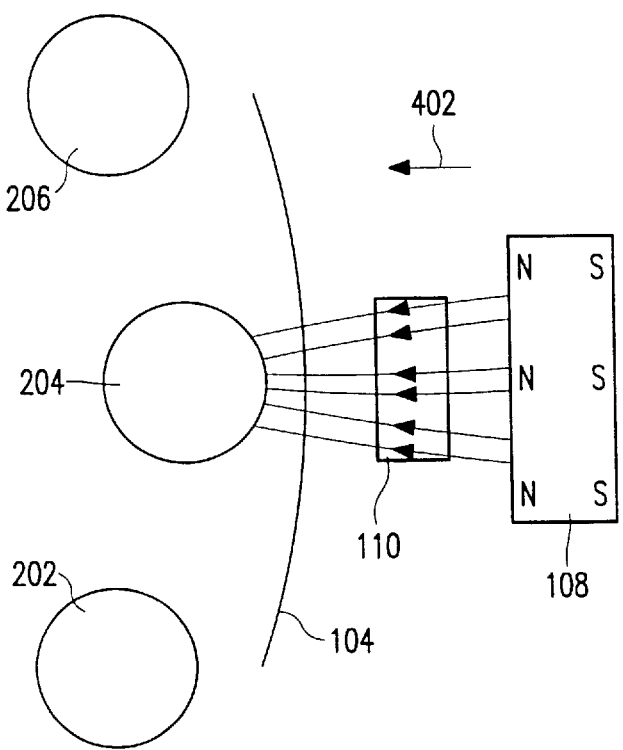
FIG. 4 shows an alternative arrangement of the magnetic field detector.

FIG. 4 shows an alternative arrangement of the magnetic field detector. The detector 110 is now sensitive to the magnetic field component in the direction 402 from the magnet to the member. The element 204 is now symmetrically situated opposite the detector, so that many field lines extend through the detector in the direction 402 in which it is sensitive. The detector will then output a comparatively large signal.

Figure 5:
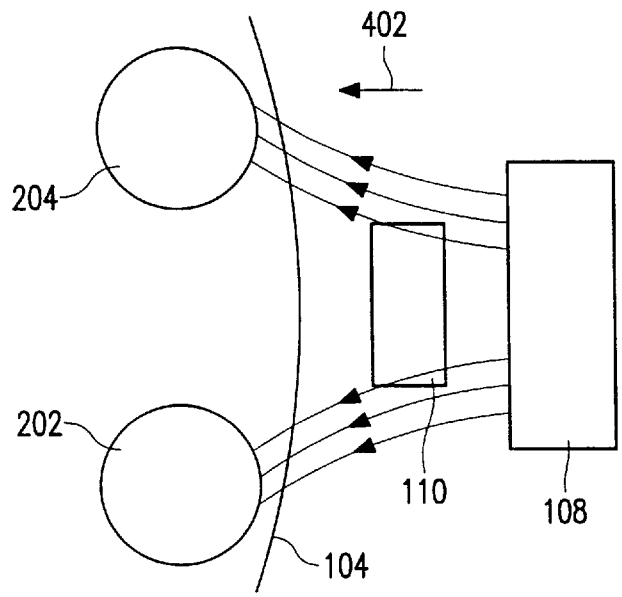
FIG. 5 shows the same arrangement as FIG. 4 after rotation of the member through a given angle.

FIG. 5 shows the same arrangement as FIG. 4 after rotation of the member through a given angle. Each of the elements 202 and 204 is now situated to a respective side of the detector 110, so that a large part of the field lines no longer passes through the detector. As a result, the detector outputs a comparatively small signal. The rotation can be established on the basis of the difference between the signal associated with the position of the member shown in FIG. 4 and the signal associated with the position of the member shown in FIG. 5.

Figure 6:
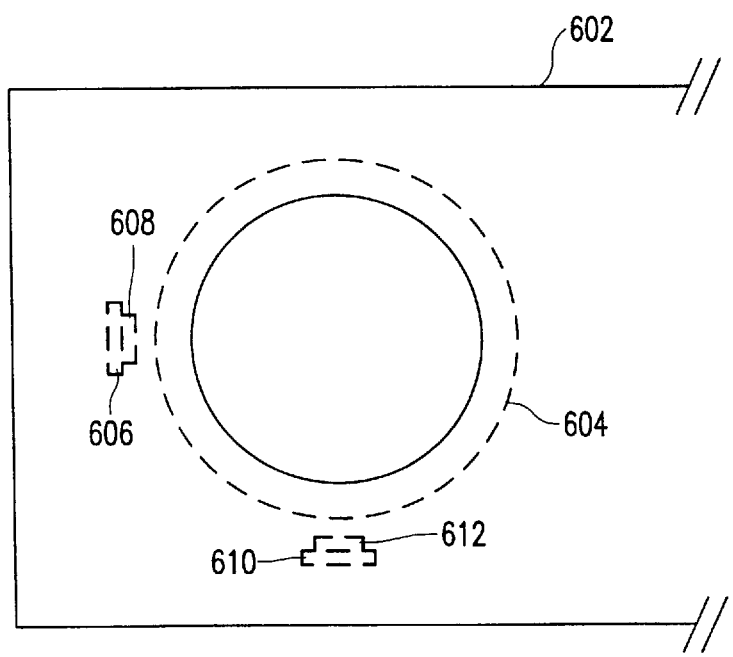
FIG. 6 is a plan view of an embodiment of the apparatus in accordance with the invention.

FIG. 6 is a plan view of an embodiment of the apparatus in accordance with the invention. The apparatus comprises a housing 602 and a spherical member 604 which is rotatable relative to the housing. In addition to a magnet 606 with an associated magnetic field detector 608 as described above, the apparatus comprises a second magnet 610 with an associated magnetic field detector 612. The two magnets enclose a mutual angle of ninety degrees relative to the center of the member. The member is rotatable in all directions about its center and each detector detects a respective component of the rotation. This apparatus can be used in a so-called track ball where a user rotates the member by direct touching. The apparatus can also be used in a mouse where the member contacts the surface on which the mouse bears and the member rotates when the mouse is laterally moved relative to the surface. When the apparatus is used in a mouse, the side of the apparatus which is visible in FIG. 6 is situated on said surface. In a given embodiment of the input apparatus in accordance with the invention, the member consists of a sphere of a synthetic resin having a diameter of approximately 2 cm, small spheres of a soft-magnetic material with a diameter of approximately 1.5 mm being embedded therein, near the surface, in a regular distribution. This embodiment utilizes a detector comprising an AMR sensor of approximately 2 mm.

The soft-magnetic elements are shaped so that the magnetic field at the area of the detector changes sufficiently in response to the passage of an element. The elements can be chosen so as to be spherical as indicated in the FIGS. 2 to 5. Other shapes, however, are also feasible, for example rods embedded in the surface of a spherical body, cubic elements and pyramidal elements. The elements should be distributed through the member in such a manner that they move past the sensor upon rotation of the member, the distribution being regular so that the number of passing elements is a measure of the rotation. In a given embodiment the member is formed by a sphere and the soft-magnetic elements have a spherical shape and are packed in a dense spherical packing in a shell near the surface of the member. Such a distribution can be readily implemented and yields a regular distribution of the elements in all directions along the member. For example, the spherical surface of the member can be approximated by a distribution of regular polygons, a soft-magnetic element being arranged at the center of each of said polygons. Another method of realizing a non-homogeneous distribution of a soft-magnetic material in the member is to provide holes in a spherical shell of a magnetic material or to provide pits in a sphere of a soft-magnetic material. The shell or the sphere may then be provided with a non-magnetic coating so as to obtain a smooth external surface of the member. In the case of rotation of the member, a regular distribution of holes or pits in a soft-magnetic material changes the magnetic field near the detector in the same way as the distribution of soft-magnetic elements.

A further embodiment of the apparatus in accordance with the invention comprises a second electromagnet, which is positioned perpendicular to electromagnet 702. This second electromagnet is also arranged for generating under the control of the data processing system a comparatively large further magnetic field. When one of the electromagnets is energised, the rotation of the member 104 is hampered in a direction which causes a displacement of the area of the member at the position of the energised electromagnet. However, a rotation in a plane perpendicular to the energised magnet, for which the axis of rotation intersects the energised electromagnet, is not hampered. So the user then experiences a preferred orientation for the rotation and this can be employed for further assisting the user to control a cursor on a display screen of the system.

Figure 7:
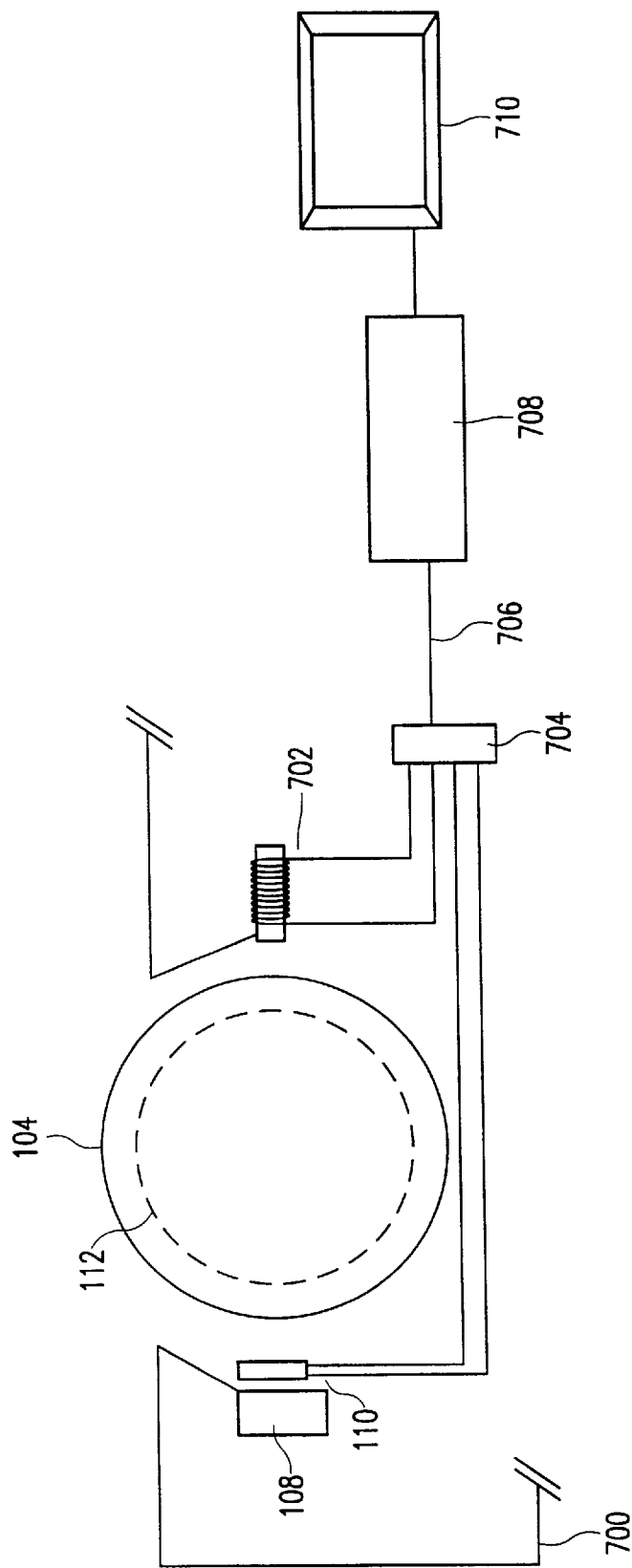
FIG. 7 shows an embodiment of the apparatus in accordance with the invention which comprises an electromagnet.

FIG. 7 shows an embodiment of the apparatus in accordance with the invention which comprises an electromagnet. This embodiment comprises an electromagnet 702 for generating, under the control of the data processing system, a comparatively large, further magnetic field at the area of the member 104. In the situation in which the electromagnet is switched on, rotation of the member by the user is hampered. The further magnetic field exerts a comparatively large force of attraction on the soft-magnetic material 112 in the member, so that the member is to some extent fixed in a given position. The user can thus be assisted in interacting with the data processing system. For example, if the input apparatus is used to control a cursor on a display screen of the system, said fixation principle can be used to pull the cursor to given positions on the display screen and to retain it therein with a given force. The input apparatus in accordance with the invention comprises an interface section 704 for local signal processing, if any, and for communication with the data processing system. In the embodiment shown in FIG. 7 the communication involves the sending of position information on the basis of the detector and the reception of the excitation signals for the electromagnet 702. To this end, the input apparatus is connected to the data processing system via an appropriate connection 706. The data processing system comprises a unit 708 which includes a processor and a working memory for the execution of programs. The unit 708 is furthermore suitable to receive input, for example from the input apparatus 700, and to despatch output, for example to the display 710 and to the electromagnet 702. If the magnet 108, generating the magnetic field on the basis of which the rotation of the member is established, is constructed as an electromagnet, the magnet 108 can perform the function of the electromagnet 702. In that case a small current is conducted through the coil of the electromagnet so as to generate the detection magnetic field and a large current is conducted through the coil so as to generate the larger magnetic field whereby the member is fixed.

Figure 8:
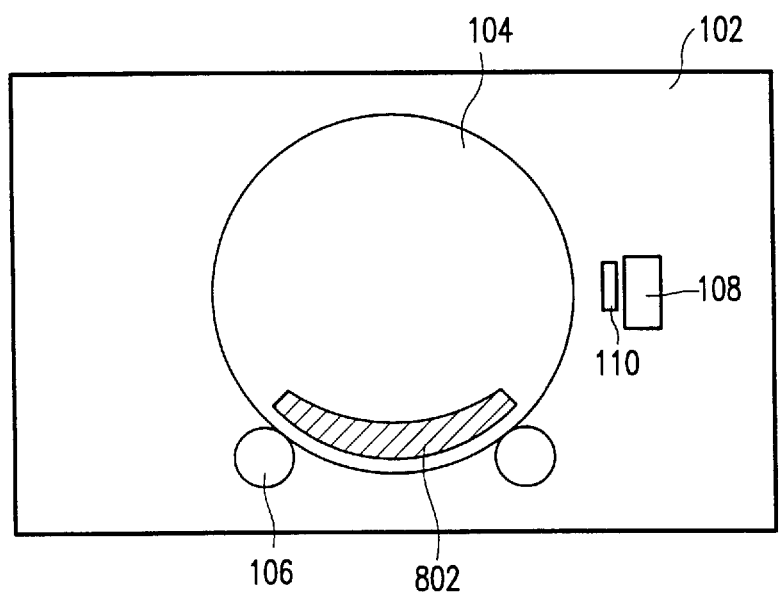
FIG. 8 is a sectional view of an alternative embodiment of the apparatus in accordance with the invention.

FIG. 8 is a sectional view of an alternative embodiment of the apparatus according to the invention. Member 104 is completely inside the housing 102 and the construction of the apparatus is similar to the ones described above in FIGS. 1 and 6. In addition to the magnet 108 and sensor 110 which detect a rotation in one direction of the member, the apparatus can be provided with a second magnet and sensor to detect a rotation in a second direction. Member 104 then has a spherical shape and can be rotated in any direction, which can be detected by the two sensors. Member 104 is at one side equipped with a comparatively heavy body 802. Due to this body, member 104 assumes under the influence of gravity a position in which body 802 is in the lowest position with respect to the centre of the member. When the housing is rotated over a certain angle with respect to the environment, member 104 remains in a steady position with respect to the environment due the gravitational force on body 802 and rotates relative to the housing 102 over the same angle. This rotation is detected through the sensors in the manner described above. So by rotating the complete apparatus, a user indirectly rotates the member relative to the housing and can control for example a cursor on a screen of a data processing system or a television set. The connection between the apparatus and the system or television can be arranged in a cordless way, e.g. by means of infrared communication. The rotational movements of the member can be damped by using a viscous fluid inside the housing. Such damping avoids sudden movements of a cursor on the screen when the apparatus is manipulated.

We claim:

1. An input apparatus for presenting data elements to a data processing system by physical manipulation by a user, the apparatus comprising:

a housing and a rotatable member rotatable relative to the housing by said manipulation, magnetic means arranged externally of the rotatable member for generating a magnetic field, and a detector for detecting rotation of said rotatable member on the basis of changes in the magnetic field caused by the rotation of the member, said member containing a soft-magnetic material, said soft magnetic material having a a non-homogeneous distribution in said rotatable member and inducing said changes in the magnetic field upon rotation of said member.

2. An input apparatus as claimed in claim 1, characterized in that the non-homogeneous distribution is comprised by discrete elements in a regular, spherical distribution, each element comprising said soft magnetic material.

3. An input apparatus as claimed in claim 1, characterized in that the soft-magnetic elements have a spherical shape and are packed in a dense spherical packing in a spherical shell of the member.

4. An input apparatus as claimed in claim 1, characterized in that the detector comprises a magnetoresistive sensor for measuring a component of the magnetic field between the magnet and the member.

5. An input apparatus as claimed in claim 4, characterized in that the magnetoresistive sensor is asymmetrically arranged between the magnet and the member in order to obtain a stabilizing magnetic field in the sensor in the direction perpendicular to the component to be measured.

6. An input apparatus as claimed in claim 4, characterized in that the detector comprises a Giant Magneto Resistive (GMR) sensor.

7. An input apparatus as claimed in claim 1, characterized in that the detector comprises a Hall sensor.

8. In input apparatus as claimed in claim 1, characterized in that the apparatus further comprises an electromagnet external of said rotatable member for generating a further magnetic field, in response to a signal from the data processing system, which communicates with said soft magnetic material for exerting a force on said member.

9. An input apparatus as claimed in claim 1, characterized in that the member incorporates asymmetrically positioned with respect to its center a comparatively heavy body.

10. A rotatable member for use in an input apparatus having means for generating a magnetic field and a detector for detecting changes in the magnetic field, said member comprising:

a spherical body having soft magentic material in a non-homogeneous distribution about said body.

11. A rotatable member according to claim 10, wherein the non-homogeneous distribution is comprised by discrete elements in a regular, spherical distribution, each element comprising said soft magnetic material.

12. A rotatable member according to claim 11, wherein said non-homogeneous distribution is comprised by said soft magnetic material having at least one of (i) pits and (ii) voids distributed therein.

13. An input apparatus according to claim 1, wherein said non-homogeneous distribution is comprised by said soft magnetic material having at least one of (i) pits and (ii) voids distributed therein.

14. An apparatus providing physical feedback to a user from a data processing system, the apparatus comprising:

a) a housing and a rotatable member rotatable relative to the housing by said manipulation, said member containing a soft-magnetic material, said soft magnetic material having a non-homogeneous distribution in said rotatable member; and b) an electromagnet external of said rotatable member for generating a magnetic field in response to a signal from the data processing system which communicates with said soft magnetic material for exerting a force on said member.

15. An input apparatus for presenting data elements to a data processing system by physical manipulation by a user, the apparatus comprising:

a) a housing and a rotatable member rotatable relative to the housing by said manipulation, b) magnetic means arranged externally of the rotatable member for generating a magnetic field, and c) a detector for detecting rotation of said rotatable member on the basis of changes in the magnetic field caused by the rotation of said member containing a soft-magnetic material, said soft magnetic material having a non-homogeneous distribution in said rotatable member and inducing said changes in the magnetic field upon rotation of said member; and d) a heavy body, comparatively heavy with respect to the total weight of said rotatable member positioned assymetrically in said rotatable member.

* * * * *